(12) United States Patent
Xue et al.

(10) Patent No.: US 12,537,382 B2
(45) Date of Patent: Jan. 27, 2026

(54) CONTROL DESIGN FOR A PHOTOVOLTAIC SYSTEM IN GRID-FORMING OPERATION FOR POWER GRID SUPPORT

(71) Applicant: Siemens Corporation, Washington, DC (US)

(72) Inventors: Nan Xue, Princeton, NJ (US); Lizhi Ding, Narberth, PA (US); Ulrich Muenz, Princeton, NJ (US)

(73) Assignee: Siemens Corporation, Washington, DC (US)

( * ) Notice: Subject to any disclaimer, the term of this patent is extended or adjusted under 35 U.S.C. 154(b) by 0 days.

(21) Appl. No.: 18/865,103

(22) PCT Filed: Aug. 18, 2022

(86) PCT No.: PCT/US2022/040688
§ 371 (c)(1),
(2) Date: Nov. 12, 2024

(87) PCT Pub. No.: WO2023/224648
PCT Pub. Date: Nov. 23, 2023

(65) Prior Publication Data
US 2025/0364812 A1 Nov. 27, 2025

Related U.S. Application Data

(60) Provisional application No. 63/343,723, filed on May 19, 2022.

(51) Int. Cl.
*H02J 3/38* (2006.01)
*H02J 3/18* (2006.01)

(52) U.S. Cl.
CPC ............... *H02J 3/388* (2020.01); *H02J 3/18* (2013.01); *H02J 3/381* (2013.01); *H02J 2300/26* (2020.01)

(58) Field of Classification Search
CPC .... H02J 3/388; H02J 3/18; H02J 3/381; H02J 2300/26
See application file for complete search history.

(56) References Cited

FOREIGN PATENT DOCUMENTS

WO   WO-2019145376 A1 *  8/2019   ............... H02J 3/381

OTHER PUBLICATIONS

Jiang Jiahui et al: "Droop Control Based Strategy for Photovoltaic Sources in anlslanded Microgrid", 2018 Australasian Universities Power Engineering Conference (AUPEC), IEEE, Nov. 27, 2018 (Nov. 27, 2018), pp. 1-6, XP033575784.

(Continued)

*Primary Examiner* — Daniel Cavallari

(57) ABSTRACT

A grid-forming photovoltaic (PV) system and method for both islanded connection and grid-connected mode is provided. An inverter converts PV array voltage to a voltage usable as a power source to an electric power system load. Active power-frequency droop controller regulates a modulator that generates drive signals to drive the inverter. Proportional integral controller generates a frequency shift value that adjusts output of the active power-frequency droop controller to yield a phase angle control for modulation of the inverter drive signals. A control mode switch selects among a plurality of control modes for operation of the proportional integral controller. A model-free control algorithm controls the control mode switch, including a control mode (221b) for synchronizing the PV system with the grid in which proportional integral controller (a) detects offset between inverter output voltage and grid output voltage and (b) generates the frequency shift value.

15 Claims, 6 Drawing Sheets

(56) References Cited

OTHER PUBLICATIONS

Ullah Shafaat et al: "Consensus-Based Delay-Tolerant Distributed SecondaryControl Strategy for Droop Controlled AC Microgrids", IEEE Access, IEEE, USA, vol. 9, Jan. 1, 2021 (Jan. 1, 2021), pp. 6033-6049, XP011830650.
Chen Zhe et al: "Overcurrent Limiting and DC Bus Voltage Ripple Minimization inGrid-Forming PV Sources under Grid Voltage Sags", 2019 IEEE 10th International Symposium On Power Electronics for Distributed Generation Systems (PEDG), IEEE,Jun. 3, 2019 (Jun. 3, 2019), pp. 964-971, XP033601817.
Jiang Jiahui et al: "A Decentralized Reliability-Enhanced Power Sharing Strategy for PV-Based Microgrids", IEEE Transactions On Power Electronics, Institute of Electrical and Electronics Engineers, USA, vol. 36, No. 6, Nov. 27, 2020 (Nov. 27, 2020), pp. 7281-7293, XP011835815.

\* cited by examiner

CONTROL DESIGN FOR A PHOTOVOLTAIC SYSTEM IN GRID-FORMING OPERATION FOR POWER GRID SUPPORT

STATEMENT REGARDING FEDERALLY SPONSORED DEVELOPMENT

Development for this invention was supported in part by Subaward Agreement No. DE-EE0009028 awarded by United States Department of Energy (DOE). The United States Government has certain rights in this invention.

TECHNICAL FIELD

This application relates to control operations for photovoltaic (PV) systems in conjunction with electric power grids. More particularly, this application relates to a model-free grid-forming control scheme for single stage and two-stage PV systems in either islanded connection or grid-connected mode.

BACKGROUND

A Photovoltaic (PV) system is an electric power system designed to supply usable solar power by means of photovoltaics. It consists of an arrangement of several components, including solar panels to absorb and convert sunlight into electricity and an inverter to convert the output from direct current to alternating current. PV systems, like other invert-based power systems (e.g., wind turbine), are controlled as current sources connected to a power grid. In other words, the inverter relies on a grid frequency detected by a phase locked loop (PLL) as a reference and injects a specified amount of current onto the power grid. The conventional current source control of the PV system inverter is based on the assumption that the grid voltage waveforms are fundamental voltage waveforms with fixed frequency and magnitude (also known as "infinite bus") and that the contribution of inverter-based power systems onto the grid is low enough so as to not cause disturbances to the grid voltage magnitude and frequency. Under this theory, the PV system simply injects the specified current onto the grid based on the fundamental voltage waveforms. However, with rapid growth of the alternative power source installations, there is a noticeable impact on the grid voltage and frequency. Reliance on renewable energy supply challenges the stability of local power system grids as more and more conventional bulk synchronous generators are retired. When a PV system is connected to a weak grid, solar power fluctuations may lead to an increase in magnitude and frequency variations in the grid voltage. These fluctuations may adversely affect the performance and stability of the PLL and inverter current control.

Many existing renewable generation inverters, operate in a "grid-following" mode. Grid-following type devices utilize fast current-regulation loops to control active and reactive power exchanged with the grid. For PV systems, the active power reference to the inverter is developed by an energy source regulator that performs Maximum Power Point Tracking (MPPT) based on a reference voltage. The inverter control includes functions that manage the real and reactive power.

Alternatively, "grid-forming" type inverters provide a voltage-source characteristic, where the angle and magnitude of the voltage are controlled to achieve the regulation functions needed by the grid. With this structure, current will flow according to the demands of the grid while the inverter contributes to establishing a voltage and frequency for the grid. This characteristic is comparable to conventional generators based on a turbine driving a synchronous machine. It is desirable for PV systems to restart a local power grid independently using grid-forming inverters. However, existing PV plants are usually connected to the electric power grid with a dedicated phase-locked loop, which requires support from the external grid and are incapable of supporting a black-start independently from grid support functions. While an integrated battery of sufficient size (e.g., 1 MW) can support black-start, most PV systems lack an integrated battery due to the expense.

Model-based grid-forming control schemes with real-time maximum power point estimation for the PV system rely on the accuracy of the PV model, which depends on multiple factors such as irradiance, temperature, shading and aging, etc. Such a computation process is complex and time-consuming. Further, as a model-based method, the method and its parameters need to be re-calculated or even re-engineered when applied to a different PV system.

SUMMARY

Aspects of the present disclosure provide a grid-forming photovoltaic (PV) system and method for both islanded connection and grid-connected mode. An inverter converts PV array voltage to a voltage usable as a power source to an electric power system load. Active power-frequency droop controller regulates a modulator that generates drive signals to drive the inverter. Proportional integral controller generates a frequency shift value that adjusts output of the active power-frequency droop controller to yield a phase angle control for modulation of the inverter drive signals. A control mode switch selects among a plurality of control modes for operation of the proportional integral controller. A model-free control algorithm controls the control mode switch, including a control mode (221b) for synchronizing the PV system with the grid in which proportional integral controller (a) detects offset between inverter output voltage and grid output voltage and (b) generates the frequency shift value.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Embodiments of this disclosure solve the technical problem of a control design for PV systems to provide grid-forming capacity in both islanded mode and grid-connected mode as a power supply to a system load. To account for various phases of PV system operation, a multi-mode switch controls an amount of frequency regulation among four modes of control signaling: (1) a zero value control signal, (2) a synchronization control signal, (3) a grid-connected control signal, and (4) a maximum power point tracking (MPPT) control signal. A smoothing circuit is included to ensure smooth transitions between switched modes of control signaling. The disclosed PV control framework supports both single-stage and two-stage PV systems. In contrast with conventional PV system control, a transition from MPPT operation to full PV system power delivery is conditional on inverter output power is being greater than the load power demand plus a user-defined power reserve value, which ensures that the PV system power can fully satisfy the power demand for the system load.

Figure 1:
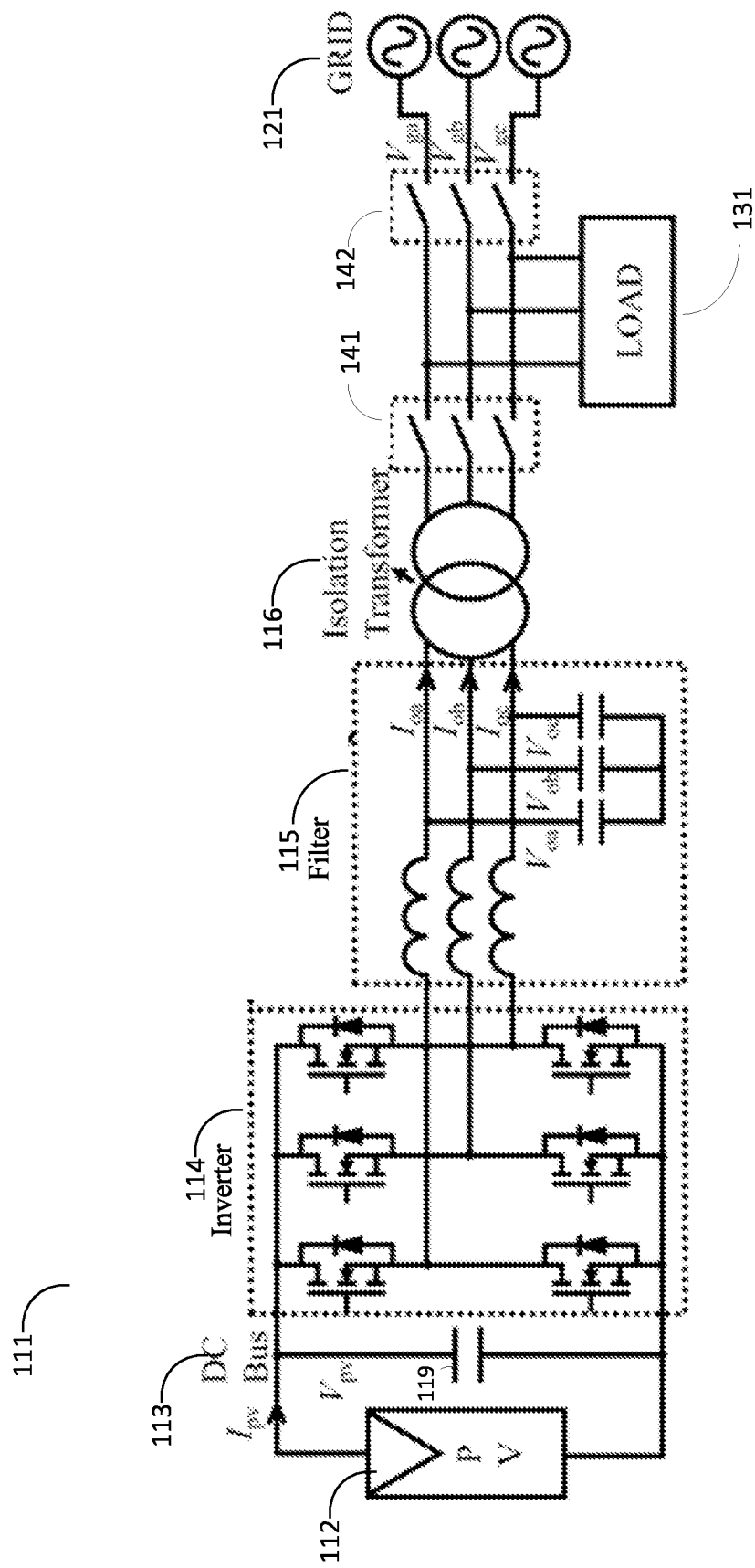
FIG. 1 shows an example schematic of a single-stage PV system supporting both islanded and grid-connected operation modes in accordance with embodiments of this disclosure.

FIG. 1 shows an example schematic of a single-stage PV system supporting both islanded and grid-connected operation modes in accordance with embodiments of this disclosure. In this example, single stage PV system 111 can deliver power to load 131 in an islanded mode or in a grid-connected mode with grid 121, depending on the state of inverter-side circuit breaker 141 and grid-side circuit breaker 142. PV system 111 includes the following components. PV array 112 is an array of solar panels that converts solar energy to a DC voltage $V_{pv}$ on DC bus 113. PV array output storage capacitor 119 is a conventional means for maintaining an operating point for the PV array. Inverter 114 converts the DC voltage to AC voltage and filter 115 removes frequency interference (e.g., leakage currents and electromagnetic interference from solar panels and switch-mode interference inherent to inverter electronics) to deliver a clean sinusoidal AC voltage compliant with power quality standards. Isolation transformer 116 prevents any DC component and electric leakage from entering the power grid 121 and helps to maintain balanced three phase voltage. In contrast with prior art solutions, grid 121 represents an electric power grid without assuming infinite bus properties. That is, embodiments of this disclosure provide a grid-forming control scheme for a PV system 111 that is configured to synchronize to a weak grid without reliance on phase locked-loop.

As shown in FIG. 1, when the inverter-side circuit breaker 141 is closed and the grid-side circuit breaker 142 is open, the single-stage PV system 111 is operated in the islanded mode, feeding load 131 independently from the grid 121. When both the inverter-side circuit breaker 141 and the grid-side circuit breaker 142 are closed, the single-stage PV system 111 is operated in the grid-connected mode, where both PV system 111 and grid 121 feed load 131.

Figure 2:
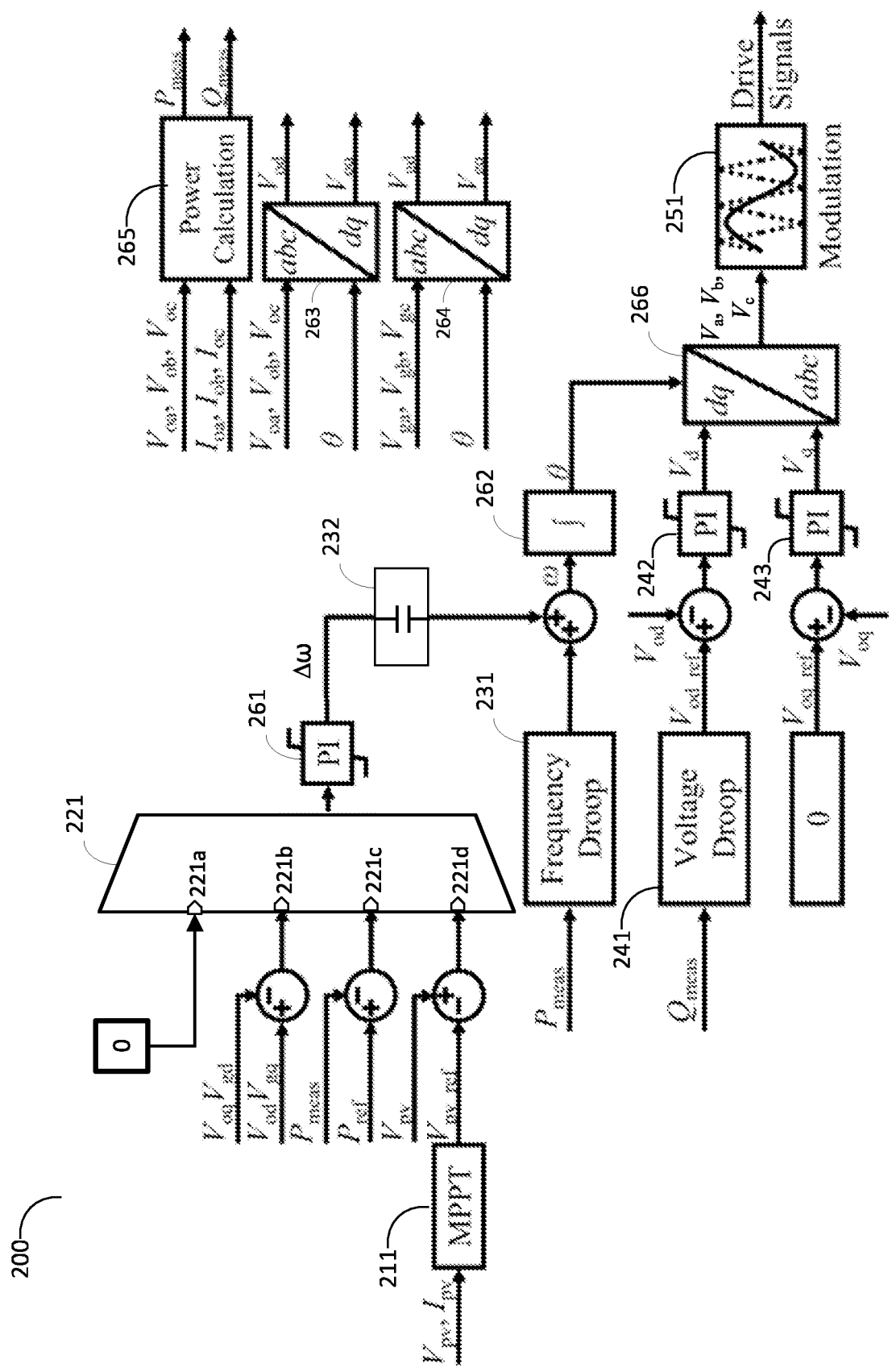
FIG. 2 shows an example of a control schematic for driving an inverter of a single stage PV system in accordance with embodiments of this disclosure.

FIG. 2 shows an example of a control schematic for driving an inverter of a single stage PV system in accordance with embodiments of this disclosure. Elements of a control scheme 200 include MPPT unit 211, mode switch 221, active power-frequency droop controller 231, reactive power-voltage droop controller 241, proportional integral (PI) controller 261, integral converter 262, Park Transform blocks 263, 264, inverse Park Transform block 266, power calculation unit 265, and modulator 251. A primary control aspect involves active power-frequency (P-f) droop controller 231 used to regulate inverter driver frequency, and reactive power-voltage (Q-V) droop controller 241 used to regulate line voltage. In an embodiment, a computer runs a control algorithm to operate mode switch 221 via a control signal for selectable shift between modes 221a, 221b, 221c and 221d depending on the state of the PV system 111 power voltage and power delivery according to PV system 111 voltage and power measurements, to be explained later with reference to FIG. 6. For modes 221b, 221c and 221d, PI controller 261 is used to detect offsets in system voltage and power values to provide a secondary control for inverter switching drivers, additional to the primary control provided by active power-frequency droop regulation of inverter frequency and reactive power-voltage droop regulation of line voltage.

Briefly, mode 221a represents a grid-forming control mode for steady state power delivery operation of PV system 111 when grid-side circuit breaker is opened to isolate load 131 when in an islanded connection. Mode 221a requires no control adjustments to inverter droop control, shown as an input value of zero at mode switch 221. PV system 111 control shifts to mode 221b when a synchronization with grid 121 is required, such as when it is determined that load 131 must be powered by grid 121 for PV system 111 power level falling below a threshold level (e.g., due to periodic reduction in available solar irradiation energy). Mode 221c operation is a control mode for when the PV system 111 is in grid-connected mode and a steady state power regulation operation is in effect while output of inverter 114 is within capacity of PV array 112, as when solar irradiance energy is readily available and PV system 111 has excess power that can be delivered to the grid 121. Mode 221d operation is initiated upon detecting low energy from PV array 112, whereby the inverter operation is regulated to match the reduced output capacity of PV array 112 (i.e., inverter operation is regulated according to a real-time maximum power point tracking to limit the inverter output). In mode 221d, the inverter input is regulated to maintain inverter output power at the maximum power point for PV array 112 experiencing reduced irradiance.

Power calculation unit 265 determines measured active power $P_{meas}$ and reactive power $Q_{meas}$ from measured output voltage $V_{oa}$, $V_{ob}$, $V_{oc}$ and output current $I_{oa}$, $I_{ob}$, $I_{oc}$, of inverter 114, as measured at filter 115.

Park transform block 263 computes inverter output voltage values $V_{od}$, $V_{oq}$ from measured output voltages $V_{oa}$, $V_{ob}$, $V_{oc}$ and phase θ. Park transform block 264 computes grid output voltage values $V_{od}$, $V_{oq}$ from measured output voltages $V_{ga}$, $V_{gb}$, $V_{gc}$ and phase θ.

Inputs to mode switch 221 include output voltage values $V_{od}$, $V_{oq}$ related to filtered inverter 114 output voltage measurement values $V_{oa}$, $V_{ob}$, $V_{oc}$, and output voltage values $V_{gd}$, $V_{gq}$ related to grid output voltage measurement values $V_{ga}$, $V_{gb}$, $V_{gc}$. During mode 221b for mode switch 221, voltage value $V_{oq}V_{ga}$ is balanced by PI controller 261 with voltage value $V_{od}V_{gq}$. This balancing has the effect of matching frequency of inverter output voltage to grid output voltage.

Other inputs to mode switch 221 include a defined reference power value $P_{ref}$ and a measured real power value $P_{meas}$ calculated by power calculator 265 from inverter output voltages $V_{oa}$, $V_{ob}$, $V_{oc}$ and output currents $I_{oa}$, $I_{ob}$, $I_{oc}$. During mode 221c, PI controller 261 determines frequency shift Δω based on offset between $P_{meas}$ and $P_{ref}$.

During mode 221d operation, inputs to mode switch 221 include DC bus voltage 113 value $V_{pv}$ and a generated reference voltage value $V_{pvref}$ determined by MPPT unit 211. PI controller 261 determines frequency shift $\Delta\omega$ based on offset between voltage values $V_{pv}$ and $V_{pvref}$ for mode 221d operation. MPPT unit 211 executes an algorithm to compute reference voltage $V_{pvref}$ for maximum power point tracking of measured inverter voltage $V_{pv}$ and current $I_{pv}$, which is used to extract maximum available power from the PV array 112.

Reactive power-voltage droop controller 241 computes reference voltage $V_{odref}$ from measured reactive power $Q_{meas}$. PI controller 242 determines offset voltage $V_d$ between inverter output voltage $V_{od}$ and reference voltage $V_{odref}$. PI controller 243 determines offset voltage $V_q$ between inverter output voltage $V_{oq}$ and reference voltage $V_{oqref}$.

Output of mode switch 221 is an angular frequency shift value $\Delta\omega$ produced by PI controller 261. A smoothing circuit 232 includes a capacitor for smoothing transitions of frequency shift value $\Delta\omega$ when switching between the plurality of control modes 221a, 221b, 221c, 221d. The frequency shift value $\Delta\omega$ is applied to adjust active power-frequency (P-f) droop 231 to yield frequency value $\omega$. An integral converter 262 converts frequency $\omega$ to yield phase angle control $\theta$. Drive signals are generated by modulator 251 for controlling inverter 114 and maintaining quality of inverter output voltage and power delivery signals. In an embodiment, modulator 251 is implemented as a pulse width modulation component. Line voltage is regulated using reactive power-voltage (QV) droop controller 241, which converts measured reactive power $Q_{meas}$ of power calculation 265, and generates reference output voltage $V_{odref}$. The modulator 251 receives voltage values $V_a$, $V_b$, $V_c$ from inverse Park transform unit 264 and phase angle control $\theta$ and generates drive signals for switching operations in inverter 114, which converts DC voltage $V_{pv}$ of PV array 112 to an AC voltage for power source delivery to load 131 following post conditioning by filter 115. This closed loop control process continuously controls inverter 114 through self-adjustment to phase angle $\theta$ based on measured output values of inverter 114, independent of any phase locked-loop operation with the grid 121.

Figure 3:
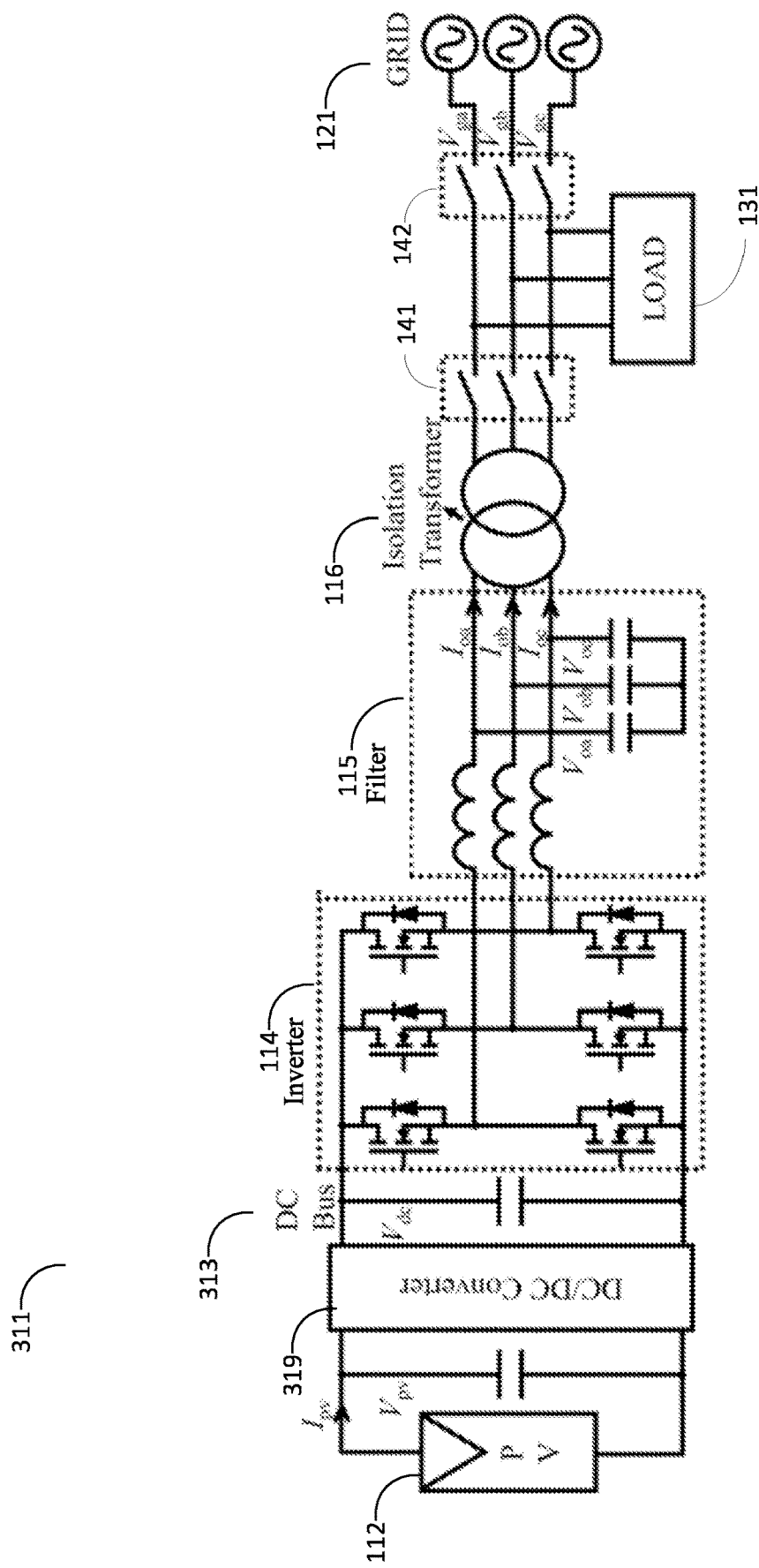
FIG. 3 shows an example schematic of a two-stage PV system supporting both islanded and grid-connected operation modes in accordance with embodiments of this disclosure.

FIG. 3 shows an example schematic of a two-stage PV system supporting both islanded and grid-connected operation modes in accordance with embodiments of this disclosure. An advantage of implementing a two-stage PV system is that grid-forming control can operate in a wider operational range from near-zero to 100% of available PV power, whereas a single stage PV system with DC link voltage limitations performs poorly at very low power outputs. PV system 311 includes all elements as described for PV system 111 in FIG. 1, with the addition of DC/DC converter 319 and voltage value $V_{dc}$ at DC bus 313. In an aspect, the DC/DC converter 319 provides a higher service voltage for delivery by the PV system 311 by stepping up the voltage from $V_{pv}$ to $V_{ac}$ and operating inverter 114 at the higher voltage.

With reference to FIG. 3, when the inverter-side circuit breaker 141 is closed and the grid-side circuit breaker 142 is open, the two-stage PV system 311 is operated in an islanded connection, feeding load 131 independently from the grid 121. When both the inverter-side circuit breaker 141 and the grid-side circuit breaker 142 are closed, the two-stage PV system 311 is operated in the grid-connected mode, where both PV system 311 and grid 121 feed load 131.

Figure 4:
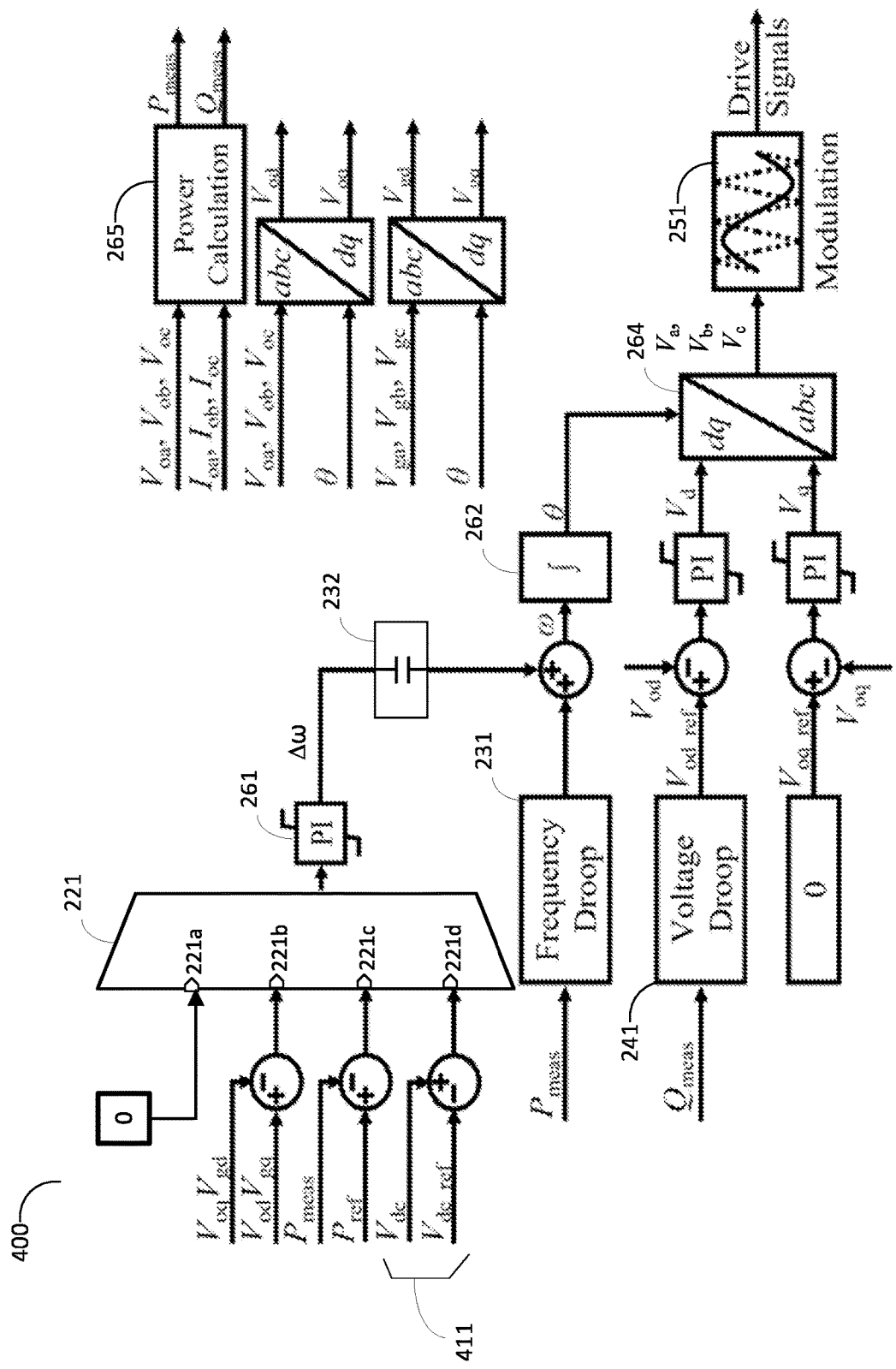
FIG. 4 shows an example of a control schematic for driving an inverter of a two-stage PV system in accordance with embodiments of this disclosure.

FIG. 4 shows an example of a control schematic for driving an inverter of a two-stage PV system in accordance with embodiments of this disclosure. The control scheme 400 resembles control scheme 200 for the single stage inverter control except for the inputs 411 at mode switch 211 applied for mode 221d operation. As shown in FIG. 4, during mode 221d, PI controller 261 regulates voltage value $V_{dc}$ with a defined reference voltage $V_{dcref}$ for producing the angular frequency shift value $\Delta\omega$ which is integrated to derive phase angle $\theta$.

Figure 5:
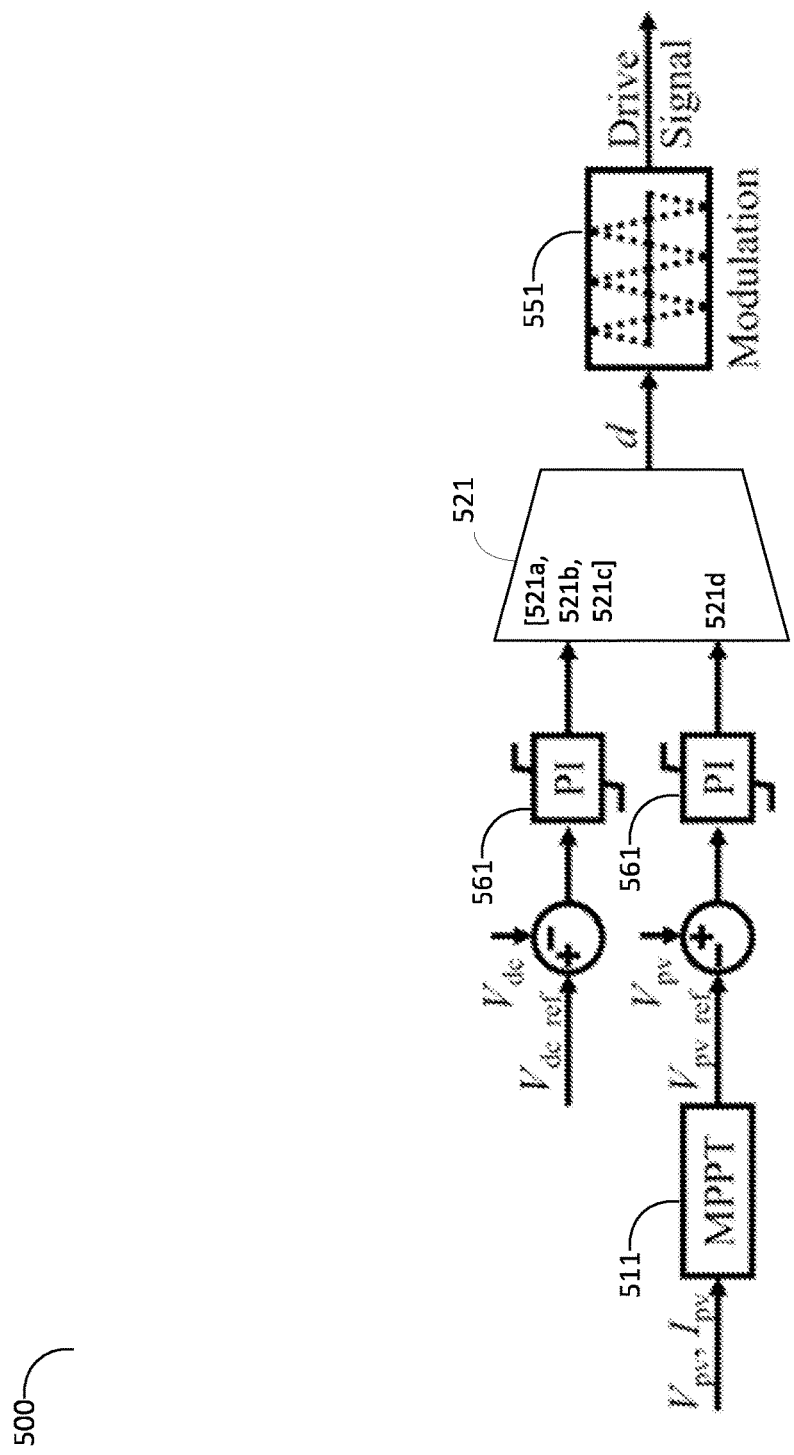
FIG. 5 shows an example of a control schematic for driving a DC/DC converter of a two-stage PV system in accordance with embodiments of this disclosure.

FIG. 5 shows an example of a control schematic for driving a DC/DC converter 319 of a two-stage PV system in accordance with embodiments of this disclosure. DC/DC converter control scheme 500 includes PI controllers 561 for regulating DC/DC converter voltages for modes 521a, 521b, 521c, 521d and generating a duty ratio d. Mode switch 521 selects which PI controller path is active according to measurements indicating the state of the PV unit 311, to be described below with reference to FIG. 6. During modes 521a, 521b, 521c, control 500 is driven by PI controller 561 regulating measured voltage DC/DC converter voltage $V_{dc}$ to defined reference voltage $V_{dcref}$. For mode 521d, a PI controller 561 regulates measured voltage $V_{pv}$ of PV unit 112 with a reference voltage $V_{pvref}$ computed by MPPT unit 511. An algorithm in MPPT unit 511 receives measured voltage and current values $V_{pv}$, $I_{pv}$ of PV unit 112 and determines the reference voltage $V_{pvref}$ that will extract the maximum available power from the PV unit 112.

Figure 6:
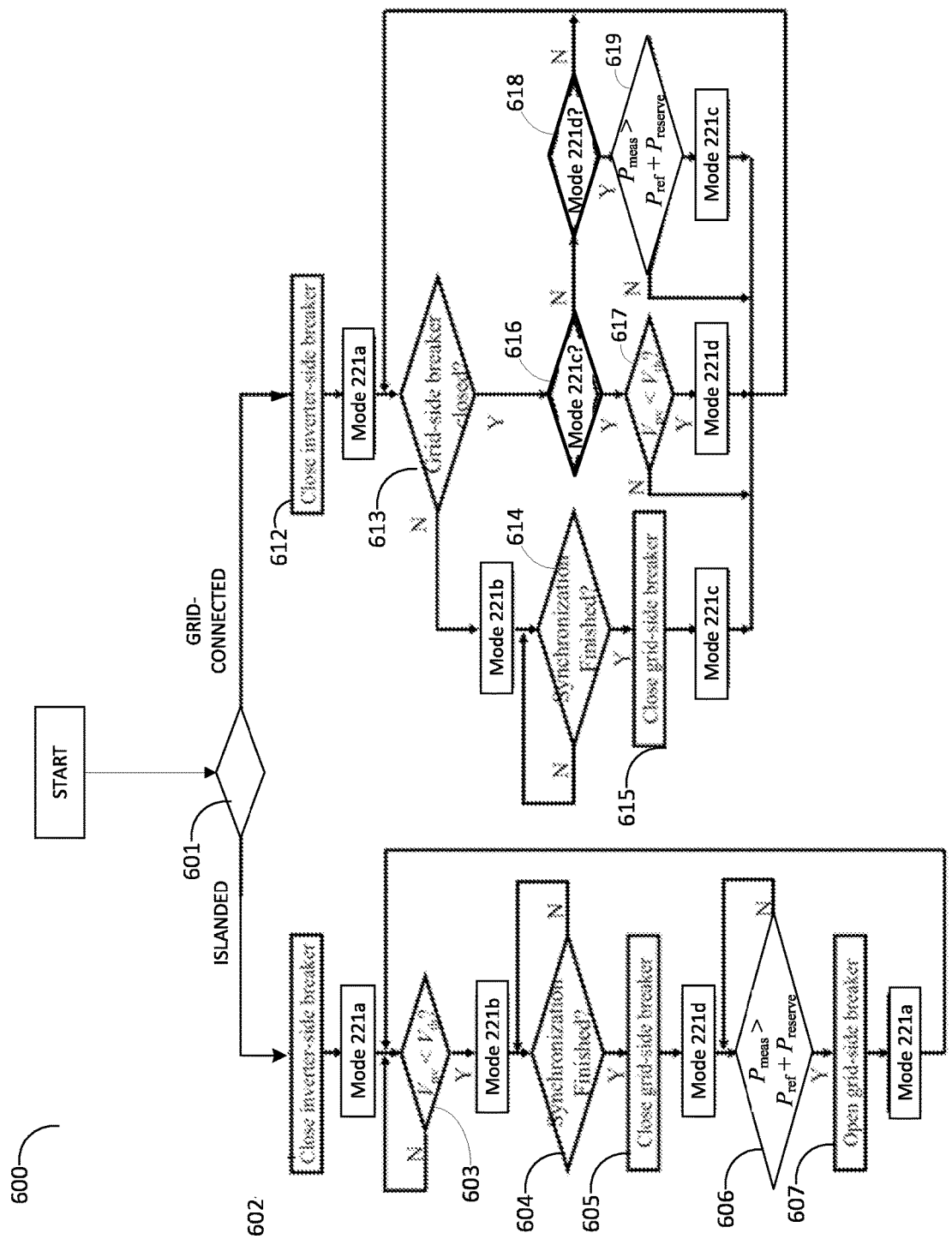
FIG. 6 is a process flowchart illustrating an example of a process for grid-forming operation in either islanded mode or grid-connected mode in accordance with embodiments of this disclosure.

FIG. 6 is a process flowchart illustrating an example of a process for grid-forming operation in either an islanded connection or a grid-connected mode in accordance with embodiments of this disclosure. Process 600 is applicable to both the single-stage PV system 111 (FIG. 1) and the two-stage PV system 311 (FIG. 3). As shown in FIG. 6, when the PV system 111/311 is operated in the islanded preferred mode, the inverter-side circuit breaker is switched to closed position (step 602) and the PV system 111/311 is the initial source for providing the energy to the load [Mode 221a]. While in this islanded connection, no secondary control of the phase angle $\theta$ is required, and the angular frequency $\omega$ is not adjusted by a PI controller 261. Mode 221a operation continues so long as the PV system voltage $V_{pv}$ measurement remains above a threshold voltage $V_{th}$ defined by system operator and based on the output storage capacitor 119 rating. If the power from the PV system 111/311 is enough for the load, the PV system will be the only source for the load. However, if the power from the PV system 111/311 is insufficient for the load, this is detectable by decreasing measurements of PV voltage $V_{pv}$. When the PV voltage $V_{pv}$ falls below threshold voltage Vth (step 603), the inverter will start to synchronize with the grid [Mode 221b] in preparation for reconnection to the grid 121. During the control mode for synchronizing the PV system 111/311 with the grid 121, PI controller 261 detects offset between output voltage of the inverter and output voltage measured at grid-side circuit breaker 142 and generates frequency shift value $\Delta\omega$ which adjusts output of active power-frequency droop controller 231 to yield the phase angle $\theta$ control for modulation of drive signals to the inverter 114.

After the synchronization process is finished (Step 604), a control signal is sent to the grid-side circuit breaker 142 to operate the grid-side circuit breaker to close (step 605) and the PV system 111/311 begins operating in the Maximum Power Point Tracking (MPPT) mode [Mode 221d]. The MPPT algorithm is implemented in the inverter 114 to produce the DC voltage reference $V_{pvref}$ and a secondary control is added to the frequency droop 231 to regulate the DC voltage $V_{pv}$ to its reference, as illustrated in FIG. 2. Then, both the PV system 111/311 and the grid 121 provides the energy for the load 131. At this stage, the inverter 114 output delivery is monitored for determining whether the solar energy has recovered to the point where the PV system 111/311 can supply the load 131 in islanded mode again. When the measured inverter output power $P_{meas}$ is greater than a reference power $P_{ref}$ based on power demand of the load 131 plus a defined power reserve $P_{reserve}$ (step 606) (e.g., defined by the system operator), which means that the PV system 111/311 power can fully satisfy the power demand for load 131, a control signal is sent to grid-side circuit breaker 142 to open (step 607) and the secondary control for MPPT is disabled by the switch 221. Then, the PV system 111/311 resumes operation in the steady state control mode for islanded connection [Mode 221a].

Next will be described the process for operating PV system 111/311 in grid-connected mode. At the start, both circuit breakers 141, 142 are in open state. At step 601, grid-connected mode is selected, and the single-stage PV system is initially operated as an islanded power supply [Mode 221a] following closing of inverter side circuit breaker (step 612). Following a short period of transition currents, the inverter 114 of PV system 111/311 system reaches a steady-state, and a synchronization process between the inverter 114 and grid 131 begins. Once the synchronization is complete (Step 614), a control signal is sent to grid-side circuit breaker 142 to close the circuit breaker (step 615). Now operating in control mode 221c as described for FIGS. 2 and 4, PI controller 261 detects offset between measured active power $P_{meas}$ and a defined reference power $P_{ref}$ and generates frequency shift $\Delta\omega$ as secondary control for power regulation to adjust active power-frequency (P-f) droop 231, enabling inverter 114 to inject the required power to the grid 121 in the steady state. If the power from the single-stage PV system cannot satisfy the power demand (e.g., weather related solar irradiance energy reduction), the PV bus voltage $V_{PV}$ will decrease. When the PV bus voltage $V_{pv}$ reaches a pre-defined threshold voltage $V_{th}$ that is below the PV maximum point voltage (Step 617), the PV system 111/311 is operated in the MPPT mode [Mode 221d]. The MPPT algorithm is implemented in the inverter to produce the DC voltage reference and the secondary control signal $\Delta\omega$ will be added the frequency droop 231 to regulate the DC voltage to its reference, as illustrated in FIG. 2. When the measured inverter output power $P_{meas}$ is greater than the reference power $P_{ref}$ plus the defined power reserve $P_{reserve}$ (step 619), which means that the PV power can fully satisfy the power demand, the PV system 111/311 returns to the power regulation mode in a steady state [Mode 221c], injecting required power to the grid 121. While grid-side breaker 142 remains closed (step 613), the grid-forming PV system 111/131 proceeds to deliver power as a grid-connected PV system either in steady state power regulation [Mode 221c] or MPPT power regulation [Mode 221d] depending on the state of the available solar energy at PV array 112 as measured at step 617 and depending on the inverter output power $P_{inv}$ relative to the demand power reference $P_{ref}$ plus power reserve $P_{reserve}$ measured at step 619.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A grid-forming photovoltaic (PV) system, comprising:
   a PV array having a DC bus and an output storage capacitor;
   an inverter coupled to the PV array to convert a PV array voltage to a voltage usable as a power source to an electric power system load in a selectable operation as islanded or grid-connected;
   a modulator configured to generate pulse width modulation for drive signals to drive the inverter;
   an active power-frequency droop controller configured to regulate the modulator;
   a proportional integral controller configured to generate a frequency shift value; wherein the frequency shift value adjusts output of the active power-frequency droop controller to yield a phase angle control for modulation of the drive signals to the inverter;
   a control mode switch configured to switch among a plurality of control modes for operation of the proportional integral controller;
   a computer comprising a model-free control algorithm for controlling the control mode switch, wherein the control algorithm, comprises:
   a first control mode (221b) for synchronizing the PV system with the grid in which a proportional integral controller (a) detects offset between output voltage of the inverter and output voltage measured at a grid side circuit breaker, and (b) generates the frequency shift value.

2. The system of claim 1, further comprising:
a smoothing circuit coupled to the proportional integral controller for smoothing transition of the frequency shift value when switching between the plurality of control modes.

3. The system of claim 1, wherein the PV system is a two-stage PV system including a DC/DC converter, the control algorithm further comprising:
regulating DC/DC converter voltages for the plurality of control modes comprising:
regulating measured DC/DC converter voltage to a defined reference voltage for control modes (221a, 221b, 221c) during steady state operation and synchronization operation; and
regulating measured output voltage of the PV array with a reference voltage computed by a maximum power point tracking algorithm for a control mode (221d) during a period of reduced irradiance energy to the PV system.

4. The system of claim 1, wherein the plurality of control modes further comprises:
a second control mode (221a) for steady state power delivery operation of the PV system when the islanded connection is selected, wherein zero frequency shift adjustment is applied.

5. The system of claim 1, wherein the plurality of control modes further comprises:
a third control mode (221c) for steady state power regulation of the PV system when the grid-connected connection is selected, wherein the proportional integral controller (a) detects offset between measured output power of the inverter and a defined reference power based on a demand load, and (b) generates the frequency shift value.

6. The system of claim 5, wherein the plurality of control modes further comprises:
a fourth control mode (221d) for regulating inverter operation according to a real-time maximum power point tracking during a period of reduced irradiance energy to the PV system.

7. The system of claim 6, wherein the fourth control mode is triggered by detecting measured PV array voltage is less than a defined voltage threshold based on a PV array output capacitor rating.

8. The system of claim 6, wherein the fourth control mode switches to the third control mode in response to detecting measured output power of the inverter greater than the sum of a reference power value and a defined reserve power value, wherein the reference power value is based on the power demand of the system load.

9. A computer-implemented method for grid-forming with a photovoltaic (PV) system, the method comprising:
controlling, using a model-free control algorithm, drive signals to an inverter that converts a PV array voltage to a voltage usable as a power source to an electric power system load in a selectable operation as islanded or grid-connected;
wherein the control algorithm includes a plurality of control modes, comprising:
a first control mode (221b) for synchronizing the PV system with the grid in which a proportional integral controller (a) detects offset between output voltage of the inverter and output voltage measured at a grid side circuit breaker, and (b) generates a frequency shift value; wherein the frequency shift value adjusts output of an active power-frequency droop controller to yield a phase angle control for modulation of the drive signals to the inverter.

10. The method of claim 9, further comprising:
smoothing transition of the frequency shift value when switching between the plurality of control modes using a smoothing circuit comprising a capacitor.

11. The method of claim 9, wherein the PV system is a two-stage PV system including a DC/DC converter, the method further comprising:
regulating DC/DC converter voltages for a plurality of control modes comprising:
regulating measured DC/DC converter voltage to a defined reference voltage for control modes (221a, 221b, 221c) during steady state operation and synchronization operation; and
regulating measured output voltage of the PV array with a reference voltage computed by a maximum power point tracking algorithm for a control mode (221d) during a period of reduced irradiance energy to the PV system.

12. The method of claim 9, wherein the plurality of control modes further comprises:
a second control mode (221a) for steady state power delivery operation of the PV system when the islanded connection is selected, wherein zero frequency shift adjustment is applied.

13. The method of claim 9, wherein the plurality of control modes further comprises:
a third control mode (221c) for steady state power regulation of the PV system when the grid-connected connection is selected, wherein the proportional integral controller (a) detects offset between measured output power of the inverter and a defined reference power based on a demand load, and (b) generates the frequency shift value.

14. The method of claim 13, wherein the plurality of control modes further comprises:
a fourth control mode (221d) for regulating inverter operation according to a real-time maximum power point tracking during a period of reduced irradiance energy to the PV system.

15. The method of claim 14,
wherein the fourth control mode is triggered by detecting measured PV array voltage is less than a defined voltage threshold based on a PV array output capacitor rating, and
wherein the fourth control mode switches to the third control mode in response to detecting measured output power of the inverter greater than the sum of a reference power value and a defined reserve power value, wherein the reference power value is based on the power demand of the system load.

* * * * *